United States Patent [19]

Fukumoto et al.

[11] Patent Number: 4,668,735
[45] Date of Patent: May 26, 1987

[54] PROCESS FOR PRODUCING POLYMALEATE

[75] Inventors: Yasuhisa Fukumoto; Noboru Moriyama, both of Utsunomiya, Japan

[73] Assignee: Kao Corporation, Tokyo, Japan

[21] Appl. No.: 821,119

[22] Filed: Jan. 21, 1986

Related U.S. Application Data

[63] Continuation of Ser. No. 537,905, Sep. 30, 1983, abandoned.

[30] Foreign Application Priority Data

Oct. 6, 1982 [JP] Japan ................................ 57-175903

[51] Int. Cl.$^4$ ............................................... C08F 2/16
[52] U.S. Cl. ..................................... 524/804; 524/817; 524/827; 524/829; 524/831; 526/218.1; 526/229; 526/230; 526/234; 526/286; 526/240; 526/303.1; 526/310; 526/311; 526/307.7; 526/317.1; 526/318
[58] Field of Search ............... 526/218.1, 229, 240, 526/234, 286, 230, 310, 303.1, 311, 317.1, 307.7, 318; 524/804, 817, 827, 829, 831

[56] References Cited

U.S. PATENT DOCUMENTS

| | | | |
|---|---|---|---|
| 2,816,083 | 12/1957 | Shearer | 526/271 |
| 3,030,342 | 4/1962 | Tiefenthal et al. | 526/240 |
| 3,083,189 | 3/1963 | Reinhard | 526/240 |
| 3,268,491 | 8/1966 | Hattori et al. | 526/271 |
| 3,359,246 | 12/1967 | Berry | 526/227 |
| 3,513,136 | 5/1970 | Blumbergs et al. | 526/271 |
| 3,635,915 | 1/1972 | Gale | 526/271 |
| 3,637,609 | 1/1972 | Blumbergs et al. | 526/271 |
| 3,691,139 | 9/1972 | Blumbergs et al. | 526/240 |
| 4,362,713 | 12/1982 | Buck | 526/240 |

FOREIGN PATENT DOCUMENTS 0597590 1/1948 United Kingdom .

Primary Examiner—Joseph L. Schofer
Assistant Examiner—J. M. Reddick
Attorney, Agent, or Firm—Flynn, Thiel, Boutell & Tanis

[57] ABSTRACT

A polymaleate having an average molecular weight of 300 to 5000 is obtained by polymerizing a monoalkali metal maleate or monoammonium maleate at 80° to 180° C. in the presence of a polymerization initiator in an aqueous solvent.

9 Claims, No Drawings

PROCESS FOR PRODUCING POLYMALEATE

This application is a continuation of U.S. Ser. No. 537,905, filed Sept. 30, 1983, now abandoned.

The present invention relates to a process for producing a polymaleate. More particularly, the invention relates to a process for producing a polymaleate having an average molecular weight in a specified range in an aqueous solvent with a high efficiency.

Polymaleic acid and copolymers of maleic acid with other monomers have been used as a dispersing agent and scale inhibitor. Polymaleic acid has been prepared in the prior art by using a peroxide such as benzoyl peroxide as a polymerization initiator in an organic solvent such as toluene or xylene. However, from the industrial viewpoint, an aqueous solvent is far preferred to an organic solvent in the production of the polymaleic acid in view of simplification of the production steps, reduction of the cost and prevention of fire hazard. Nevertheless, there can hardly be found reports of the polymerization of maleate in an aqueous solvent. Only reports relating to copolymers of maleic acid with acrylic acid or vinyl acetate are found.

After intensive investigations of the polymerization reaction of maleates in an aqueous medium carried out under these circumstances, the inventors have found that a polymaleate having an average molecular weight of 300 to 5000 can be produced efficiently by using a monoalkali metal maleate or monoammonium maleate as the monomer. The present invention has been completed on the basis of this finding. The present invention provides a process for producing a polymaleate having an average molecular weight of 300 to 5000 characterized by polymerizing a monoalkali metal maleate or monoammonium maleate at 80° to 180° C. in the presence of a polymerization initiator in an aqueous solvent.

The process of the present invention will now be described in detail. First, an aqueous solution of maleic acid or maleic anhydride is prepared. Then, an aqueous solution of an alkali metal hydroxide such as sodium hydroxide or potassium hydroxide or aqueous ammonia is added to the solution in a quantity equimolar to maleic acid or maleic anhydride or a quantity excess by up to 10 molar % to obtain an aqueous solution of a monoalkali metal maleate or monoammonium maleate having a pH of 3.5 to 5.0. A polymerization initiator preferably in an amount of 0.02 to 0.6 mol, particularly 0.05 to 0.4 mol, per mol of the monomer, is added to the aqueous solution at once or in portions. The polymerization is carried out at 80° to 180° C., preferably 100° to 150° C.

The concentration of the aqueous solution of the monoalkali metal maleate or monoammonium maleate used in the process of the present invention is not particularly limited. However, a solid concentration of 30 to 60 wt. % is preferred in practice. Though the polymerization reaction time is not particularly limited as well, it is preferably at least 3 h, particularly 4 to 10 h.

As the polymerization initiator used for the polymerization reaction, there may be mentioned hydroperoxides such as t-butyl hydroperoxide or cumene hydroperoxide; dialkyl peroxides such as di-t-butyl peroxide; persulfates such as ammonium persulfate; redox initiators such as persulfate/sulfite; and water-soluble azobis compounds.

According to the process of the present invention, polymaleates having an average molecular weight of 300 to 5000 can be obtained efficiently and easily. Though the mechanism has not been elucidated yet, it is considered that the monoalkali metal maleate or monoammonium maleate forms an intramolecular hydrogen bond in the aqueous solution to realize a planar structure, whereby the radical resonance stabilization is enhanced and the polymerizability is improved.

In the process of the present invention, up to 20 molar %, based on the maleate, of an unsaturated carboxylic acid such as acrylic acid, methacrylic acid or itaconic acid; an acrylic derivative such as an acrylamide, (meth)acrylate or hydroxy(meth)acrylate; or an unsaturated sulfonic acid such as styrenesulfonic acid or allylsulfonic acid may be added to the reaction system to produce the copolymer of the maleate with the unsaturated compound efficiently.

The polymaleates produced by the process of the present invention have particularly excellent dispersing capacity and calcium ion-uptaking capacity and they can be used as a scaling inhibitor, pigment dispersant or builder for a detergent.

The following examples will further illustrate the present invention, which by no means limit the invention.

EXAMPLE 1

102 g (1.224 mol as pure sodium hydroxide) of 48% aqueous sodium hydroxide solution was added to an aqueous solution containing 117.6 g (1.2 mol) of maleic anhydride to obtain 50 wt. % aqueous solution of monosodium maleate. The whole quantity of the aqueous solution was transferred into a 500 ml autoclave. Nitrogen was introduced therein under stirring and the temperature of the reaction system was elevated to 90° C. 10.13 g (8.104 g as pure t-butyl peroxide) of 80% t-butyl peroxide (molecular weight: 90) was introduced into the reaction system as a polymerization initiator through a sample-inlet tube. Thereafter, the introduction of nitrogen was stopped. The autoclave was closed and the temperature was elevated to 130° C. The stirring was continued at that temperature for 2 h and the reaction system was cooled to 90° C. At this time, the aqueous solution had a pH of 5.2 and a concentration of 3%. Hydrochloric acid was added to the mixture through another sample-inlet pipe to control the pH of the 3% aqueous solution to 4.1, since a pH in the range of 3.5 to 5.0 is preferred for accelerating the reaction. Additional 10.13 g of 80% t-butyl hydroperoxide was introduced in the reaction system through the sample-inlet tube. The autoclave was closed and the temperature was elevated to 130° C. The stirring was effected at this temperature for 1.5 h. Then, the reaction system was cooled to 90° C. 5.4 g of 80% t-butyl hydroperoxide was added to the mixture. The pH of the 3% aqueous solution was controlled to 4.12 with hydrochloric acid. The temperature was elevated to 130° C. and the mixture was stirred at this temperature for 1.5 h to complete the reaction. The quantity of the polymerization initiator was about 0.23 mol per mol of maleic anhydride. A filter aid (trade name: Radiolite #900) was added to the reaction mixture to effect filtration through a glass filter and obtain 3% aqueous solution of monosodium polymaleate having a solid content of 43% and a pH of 4.4. The polymerization rate was determined from the results of determination of maleic acid residue according to the bromine/bromide method.

For comparison, a polymaleate was prepared in the same manner as above except that the quantity of sodium hydroxide used for the neutralization of the initial 50 wt. % aqueous maleate solution was varied. The average molecular weights of the resulting polymer salts and polymerization rates are shown in Table 1.

TABLE 1

| Run No. | Degree of neutralization of maleic acid (molar ratio of maleic acid/NaOH) | Final pH | Polymerization rate (molar %) | Average molecular weight *1 |
|---|---|---|---|---|
| 1 | 1.00/1.02 | 4.4 | 92.8 | 550 |
| 2 | 1.00/2.00 | 11.0 | 64.0 | — |
| 3 | 1.00/0.75 | 3.1 | 49.2 | — |

Run No. 1: example of the present invention
Run Nos. 2 and 3: comparative examples
*1 Average molecular weight: The sodium salt of the polymer was diluted to 500 mg/100 ml (as solid) with deionized water. A 100 μl portion of the solution was taken and number-average molecular weight was determined according to gel permeation chromatography in a 0.15 M phosphate buffer solution (pH 7.0) using an aqueous column G 4000PW/G2000SW (a product of Toyo Soda Co., Ltd.) at room temperature. Light absorption at 215 nm was determined by means of Spectrophotometric detector SPD-1 (a product of Shimadzu Seisaku-Sho Co., Ltd.). In the following examples, the average molecular weights were determined in the same manner as above.

In the comparative examples, the average molecular weights were not determined, since the polymerization rates were low.

The reaction in Run No. 2 was a polymerization reaction using disodium maleate. The reaction in Run No. 3 was a copolymerization reaction using a mixture of monosodium maleate and maleic acid.

EXAMPLE 2

The same procedure as in Experiment No. 1 in Example 1 was repeated except that the concentration of monosodium maleate in the aqueous solution was varied. The results are shown in Table 2.

TABLE 2

| Experiment No. | Conc. of monosodium maleate (wt. %) | Polymerization rate (molar %) | Average molecular weight |
|---|---|---|---|
| 4 | 40 | 90.8 | 480 |
| 5 | 30 | 84.5 | 420 |

EXAMPLE 3

The whole quantity of 50 wt. % aqueous solution of monosodium maleate prepared in the same manner as in Example 1 was charged in a 500 ml autoclave. The temperature of the reaction system was elevated to 90° C. 22 g of 80% cumene hydroperoxide (molecular weight: 152) as a polymerization initiator was introduced in the reaction system through a sample-inlet tube. The mixture was stirred at 130° C. for 2 h and then cooled to 90° C. The pH of the 3% aqueous solution was controlled to 4.2 with hydrochloric acid. Additional 22 g of 80% cumene hydroperoxide was added to the mixture. After stirring at 130° C. for 2 h, the reaction system was cooled to 90° C. Additional 10 g of 80% cumene hydroperoxide was added to the mixture and stirring was continued at 130° C. for 1 h to complete the reaction. The quantity of the polymerization initiator was about 0.24 mol per mol of maleic anhydride. The solvent for cumene hydroperoxide was stripped under vacuum. Water was added to the resulting residue to obtain an aqueous sodium polymaleate solution having a solid content of 40 wt. %. The results are shown in Table 3.

TABLE 3

| Experiment No. | Degree of neutralization of maleic acid (molar ratio of maleic acid/NaOH) | Final pH | Polymerization rate (molar %) | Average molecular weight |
|---|---|---|---|---|
| 6 | 1.00/1.02 | 4.35 | 91.1 | 610 |

EXAMPLE 4

An aqueous solution of 198 g (2.0 mol) of maleic anhydride was introduced into a one liter, four-necked flask provided with a stirrer, a tap funnel and a reflux condenser and then 170 g of a 48% aqueous caustic soda solution was added thereto in order to prepare a 50% aqueous solution of monosodium maleate. A pH value of the obtained solution was 4.1 at a concentration of 3%. The aqueous solution was heated up to 100° C. while agitated. After that, a solution obtained by dissolving 23.8 g of sodium persulfate in 150 g of 35% aqueous hydrogen peroxide was added dropwise over a period of 5 hours with a tap funnel. Thereafter the mixture was stirred at 100° C. for further 2 hours in order to complete the reaction. Then the aqueous solution was cooled down to a room temperature and filterated with a glass filter with a filter assistant a tradename of which was Radiorite #900. In this way, an aqueous solution of monosodium polymaleate having a solid content of 39%. A pH value of the solution was 5.2 at a concentration of 3%.

A polymerization rate of the example was measured based on quantitative determination of remaining maleic acid according to the bromine/bromide method. Results are shown in Table 4.

TABLE 4

| Run No. | degree of neutralization of maleic acid (molar ratio of maleic acid to NaOH) | final pH | polymerization rate (mole %) | average molecular weight |
|---|---|---|---|---|
| 7 | 1.00/1.02 | 5.2 | 92.2 | 690 |

What is claimed is:

1. A process for producing a polymaleate having an average moleular weight of 300 to 5000, which comprises the steps of preparing an aqueous solution consisting essentially of from 30 to 60 wt. % of a maleate monomer selected from the group consisting of monosodium maleate, monopotassium maleate and monoammonium maleate, and the balance is essentially water; then polymerizing said maleate monomer in said aqueous solution, in the presence of 0.02 to 0.6 mol, per mol of said monomer, of a polymerization initiator effective to initiate polymerization of said maleate monomer, at a polymerization temperature in the range of 80° C. to 180° C. so that an aqueous solution of said polymaleate is formed.

2. A process as claimed in claim 1, in which said aqueous solution of said maleate monomer is prepared by dissolving maleic acid or maleic anhydride in water, then adding an aqueous solution of a member selected from the group consisting of sodium hydroxide, potassium hydroxide and ammonia to the aqueous solution of maleic acid or maleic anhydride whereby to form said aqueous solution of said maleate monomer, the amount of said sodium hydroxide, potassium hydroxide or ammonia added to the aqueous solution of maleic acid or maleic anhydride being in the range of from an equimolar amount to a 10% molar excess, based on the amount of maleic acid or maleic anhydride, said aqueous solution of said maleate monomer having a pH in the range of 3.5 to 5.0.

3. A process as claimed in claim 1, wherein said polymerization initiator is selected from the group consisting of t-butyl hydroperoxide, cumene hydroperoxide, di-t-butyl peroxide, and ammonium persulfate.

4. A process as claimed in claim 1, wherein said step of polymerizing said maleate monomer is conducted for at least 3 hours.

5. A process as claimed in claim 4, wherein said step of polymerizing said maleate monomer is conducted for a period in the range of 4 to 10 hours at a temperature in the range of 100° C. to 150° C., at a pH of said maleate monomer solution in the range of 3.5 to 5.0.

6. A process as claimed in claim 3, wherein the amount of said polymerization initiator is in the range of 0.05 to 0.4 mol, per mol of said maleate monomer.

7. A process for the preparation of a polymaleate having an average molecular weight in the range of 300 to 5000, consisting essentially of the steps of:
preparing a first aqueous solution consisting essentially of maleic acid or maleic anhydride dissolved in water;
adding to said first aqueous solution a second aqueous solution having dissolved therein from an equimolar amount to a 10% molar excess, based on the molar amount of said maleic acid or maleic anhydride in said first solution, of at least one member selected from the group consisting of sodium hydroxide, potassium hydroxide, and ammonia, to form an aqueous monomer solution having a pH in the range of 3.5 to 5.0 and containing from 30 to 60 wt. %, of a monomer selected from the group consisting of monosodium maleate, monopotassium maleate, and monoammonium maleate;
adding to said monomer solution 0.02 to 0.6 mol, per mol of said monomer, of a polymerization initiator selected from the group consisting of hydroperoxides, persulfates, redox initiators and water-soluble azobis compounds;
polymerizing said monomer for at least 3 hours at a temperature in the range of 80° C. to 180° C.; and
recovering an aqueous solution of the thus-formed polymaleate.

8. A process for producing a polymer having an average molecular weight of 300 to 5000, which comprises the steps of preparing an aqueous solution consisting essentially of from 30 to 60 wt. % of a maleate monomer selected from the group consisting of monosodium maleate, monopotassium maleate and monoammonium maleate, mixed with up to 20 molar %, based on said maleate monomer, of a second monomer that is copolymerizable with said maleate, said second monomer being selected from the group consisting of polymerizable unsaturated carboxylic acids different from maleic acid, acrylate monomers, acrylamide monomers and unsaturated sulfonic acid monomers, then polymerizing said mixture of monomers in said aqueous solution, in the presence of 0.02 to 0.6 mol, per mol of said monomers, of a polymerization initiator effective to initiate polymerization of said monomers, at a polymerization temperature in the range of 80° C. to 180° C. so that an aqueous solution of said polymer is formed.

9. A process according to claim 8, wherein said second monomer is selected from the group consisting of acrylic acid, methacrylic acid, itaconic acid, acrylamide, methacrylate, hydroxymethacrylate, styrene sulfonic acid and allyl sulfonic acid.

* * * * *